April 4, 1950     H. T. GITTINGS, JR     2,502,450
ELECTRONIC TIMING APPARATUS

Filed Nov. 10, 1947     2 Sheets-Sheet 1

Inventor
H. T. Gittings, Jr.
By M. O. Hayes
Attorney

Inventor
H. T. Gittings, Jr.
M. O. Hayes
Attorney

Patented Apr. 4, 1950

2,502,450

UNITED STATES PATENT OFFICE 2,502,450

ELECTRONIC TIMING APPARATUS

Homer T. Gittings, Jr., Los Alamos, N. Mex.

Application November 10, 1947, Serial No. 784,955

5 Claims. (Cl. 175—381)

(Granted under the act of March 3, 1883, as amended April 30, 1928; 370 O. G. 757)

This invention relates to improvements in electronic timing devices of the type in which the duration of the time interval to be measured is ascertained by measuring the amount of charge supplied to a timing capacitor through a charging circuit. More particularly, the invention contemplates an improved circuit wherein the timing charge is limited substantially to the linear portion of the charging characteristic of the capacitor when charged from a constant potential source through a resistor, and provides a direct reading vacuum tube voltmeter of very high impedance adapted to measure the charge on the capacitor, the scale of the vacuum tube voltmeter being calibrated directly in time intervals, suitable switching means being provided for supplying a number of scales of varying time intervals for the voltmeter.

Prior art devices which measure the time required for the consummation of an operation by ascertaining the amount of charge supplied to a timing capacitor have disadvantages and limitations upon their usefulness as a result of the somewhat complicated circuits employed, and for other reasons. For example, the apparatus described in Patent No. 2,021,766 to Maurice E. Bivens, issued November 19, 1935 employs a special electron tube arrangement to provide a constant current charging source in order to provide a condition in which the potential at the capacitor varies linearly with time. In this apparatus also the voltage acquired by the timing capacitor is compared with a measurable voltage to determine the length of the time interval. The circuit is further complicated by the necessity for providing an arrangement in which current is initiated in one tube at the beginning of a time interval to be measured and shifted to another tube at the end of the time interval to be measured. Patent No. 2,177,569 to M. O. Jorgensen et al., issued October 24, 1939, employs a circuit arrangement for measuring short time intervals by means of a capacitor which is charged and discharged through resistances, but the apparatus of Jorgensen lacks the versatility, sensitivity, and accuracy provided by the instant invention, for the reason that Jorgensen neither shows nor suggests apparatus for limiting the charging of the capacitor to a rate which provides a linear condition, and for other reasons which will be obvious upon a comparison of the two circuits. Patent No. 2,409,888 to J. Ogden, issued October 22, 1946, employs the basic idea of measuring a time interval by means of the charge on a capacitor, but the circuit of Ogden is highly complex, requiring the use of relays and other apparatus, and is unsuited to fulfill the purposes of the instant invention, as will be apparent from an inspection of the Ogden patent specification.

The apparatus of the instant invention provides a simple, inexpensive electronic timer adapted to measure the various time intervals associated with switch and relay operation; for example, it measures the time between the operation of a pair of switches either of which may be normally open or normally closed, momentary closure or opening of a contact, relay pickup and dropout time, and switch transit time.

As before-mentioned the principle employed in the instant invention is the partial charging of a capacitor during the time interval to be measured, the charge being limited in such a manner as to provide a linear voltage-time relationship. As is well known in the art, the capacitor voltage buildup is substantially linear with time at the beginning of the charging curve when the capacitor is charged from a constant potential source through a resistor. In the instant invention, the charging of the capacitor is limited to this portion. Switching circuits are provided to permit any of the before-mentioned types of measurements to be made. A vacuum tube voltmeter of high accuracy, the scale of which is directly calibrated in time intervals, is provided, the voltmeter being of a cathode follower type and having a very high input impedance of the order of several thousand megohms, thereby substantially preventing draining of the charge on the capacitor.

One of the objects of the invention resides in the provision of new and improved direct reading electronic timing apparatus.

A further object resides in the provision of a new and improved electronic timer adapted to measure the time required for the operation of switch contacts and relay contacts.

Another object resides in the provision of new and improved electronic timing apparatus which operates on the linear portion of the voltage-time charging characteristic of a capacitor and which is characterized by increased accuracy and sensitivity.

A further object resides in the provision of a new and improved circuit having provision for varying the R.-C. constant of the circuit in order to operate on the linear portion of the charging characteristic of the capacitor.

Other objects and advantages not specifically set forth hereinbefore will be apparent after a perusal of the accompanying specification taken in connection with the accompanying drawings in which.

Figure 1:
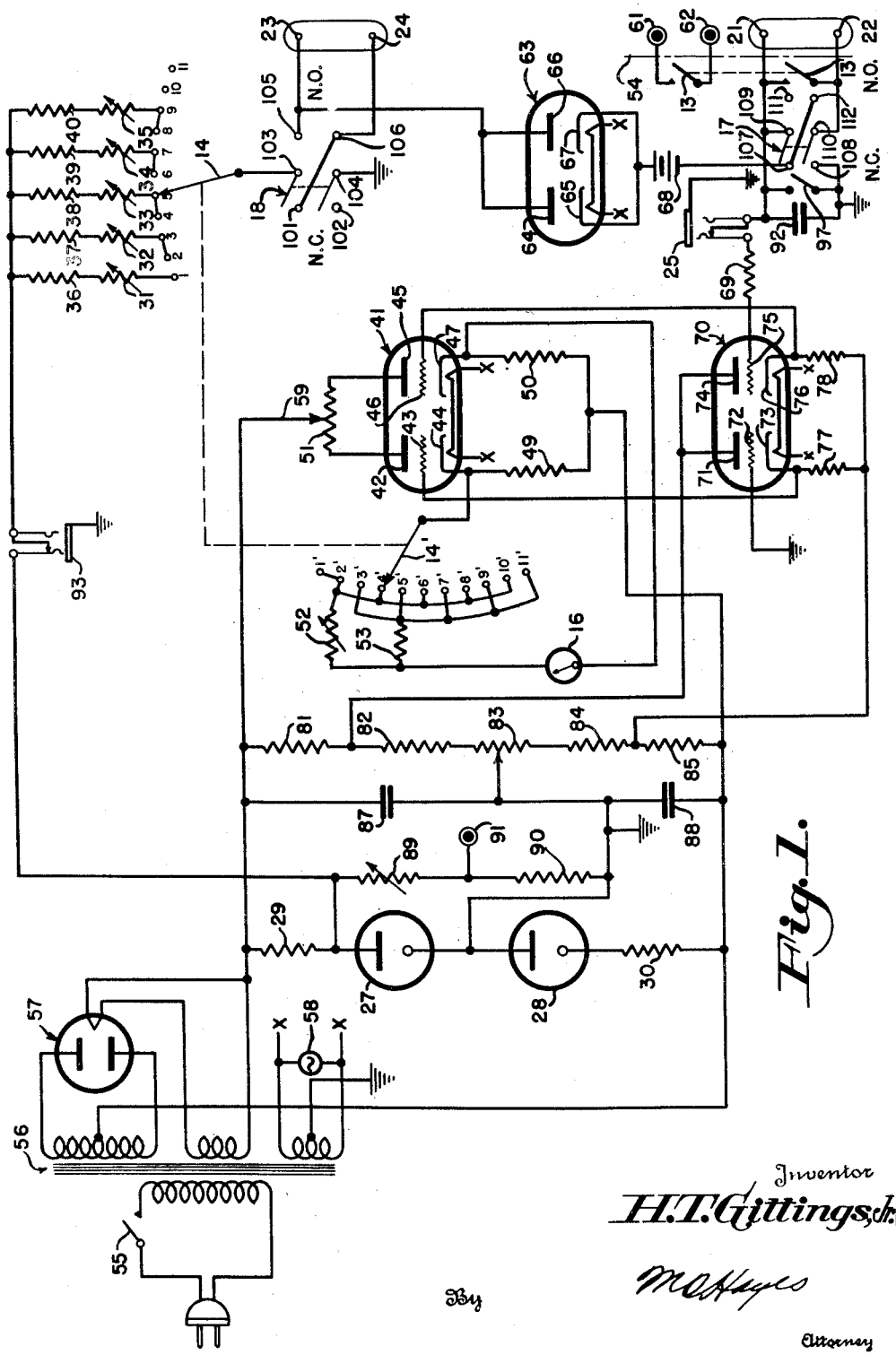
Fig. 1 is a complete schematic electrical circuit diagram of the preferred embodiment of the invention.

Referring now particularly to the drawings and to Fig. 1 thereof, there is provided a power supply having a transformer generally designated by the reference numeral 56 and having a pair of low voltage windings, and a high voltage winding which is adapted to supply a voltage which when rectified by full wave rectifier tube 57, which may be of conventional design, provides a rectified D. C. for the operation of the electron discharge tubes hereafter to be described. The transformer 56 has a primary winding which is adapted to be connected to a convenient and suitable source of alternating current, for example, 110 volts A. C., 60 cycles, the primary circuit having switch 55 connected therein for controlling the application of the voltage to the transformer 56. The low voltage secondary winding which is adapted to heat the heaters of the various electron discharge tubes also has a pilot lamp 58 connected thereacross to indicate when power is being supplied to the apparatus. Across the high voltage leads of direct current is connected a voltage regulator circuit comprising a pair of voltage regulator tubes 27 and 28, which may be of conventional design, and which are connected in series with resistors 29 and 30 across the before-mentioned positive and negative output leads of the power supply. Across these leads are also connected a pair of filter capacitors 87 and 88 in series. Across the positive and negative leads is also connected a voltage divider comprising in series fixed resistors 81 and 82, potentiometer 83, and fixed resistors 84 and 85. Resistors 89 and 90 are connected in series across voltage regulator tube 27, the mid-point between resistors 89 and 90 being connected to a terminal 91 for purposes to be hereafter described. The arm of the before-mentioned potentiometer 83 is connected to the junction between the capacitors 87 and 88 and is also connected to ground and to the junction between voltage regulator tubes 27 and 28. The before described circuit arrangement provides all necessary operating voltages for the electron discharge tubes of the vacuum tube voltmeter, in addition to supplying the potential for charging the capacitor which is employed for timing purposes, the manner in which these voltages are applied to be hereinafter described.

As previously stated, a vacuum tube voltmeter of high input impedance is provided for measuring the voltage across the capacitor. This voltmeter includes two double triodes 41 and 70 comprising four electron discharge tubes. It is of course understood that any suitable electron discharge tube of other types could be employed if desired. The two sets of elements or tubes of double triode 41 comprise first, anode 42, control grid 43, and cathode 44, and second, anode 45, control grid 46, and cathode 47. The double triode designated 70 comprises two electron discharge tubes or sets of elements, one set comprising anode 71, control grid 72, and cathode 73, the other set comprising anode 74, control grid 75, and cathode 76. Cathode 76 of tube 70 is connected to control grid 46 of tube 41. Cathode 73 of tube 70 is connected to control grid 43 of tube 41. Cathodes 73 and 76 are further connected through resistors 77 and 78 respectively to the junction between resistors 84 and 85 of the aforementioned voltage divider. Control grid 72 is connected to ground, while control grid 75 is connected through resistor 69 to one contact of a closed circuit jack generally designated at 25, the other contact being connected to one terminal of a capacitor 92 which is employed for timing purposes, the other terminal of the capacitor being connected to ground. Anodes 71 and 74 are connected together and to the junction between resistors 81 and 82 of the aforedescribed voltage divider, this connection providing the necessary energizing potential for the anode-cathode circuit of tube 70. Cathodes 44 and 47 of tube 41 are connected through resistors 49 and 50 respectively to the negative terminal of the power supply. Anodes 42 and 45 of an electron discharge tube 41 are connected to the ends of a balancing or zero set potentiometer 51, the arm of which is connected to the positive terminal of the power supply, these connections providing energizing potential differences between the cathodes and respective anodes of tube 41. A voltmeter circuit is connected between cathodes 44 and 47 and comprises an indicating meter 16, resistors 52 and 53, and a single pole multiple throw switch having an arm 14' and contacts 1' to 11', inclusive, contacts 1', 2', 4', 6', 8' and 10' being connected together and to resistor 52; contacts 3', 5', 7', 9' and 11' being connected together and to resistor 53. The vacuum tube voltmeter circuit traced constitutes a highly sensitive and accurate circuit, the operation of which may be summarized as follows: Assuming no charge on capacitor 92 and the contacts of jack 25 closed, the control grids 72 and 75 of tube 70 will be of substantially the same potential so that the voltages developed across resistors 77 and 78 will be substantially equal, and equal voltages will be applied to control grids 43 and 46 of electron discharge tube 41, providing, assuming that the potentiometer 51 has been properly adjusted to balance the currents in the sections of tube 41, that the cathodes 44 and 47 are at substantially the same potential and that no potential difference is applied across indicating meter 16.

Assume now by way of description that capacitor 92 is charged in a manner to be hereafter described. The voltage upon control grid 75 becomes greater than that upon control grid 72 with the result that cathodes 44 and 47 of electron discharge tube 41 assume different potentials resulting in a flow of current through meter 16 and one of the resistors 52 and 53 depending upon the position of switch arm 14', the flow of current being proportional to the potential difference between the cathodes 44 and 47, and to the potential upon capacitor 92, as will be readily understood by those skilled in the art. The arm 14' is ganged to the arm 14 of a second single pole multiple throw switch to be presently described, for purposes to be hereafter apparent.

Figure 2:
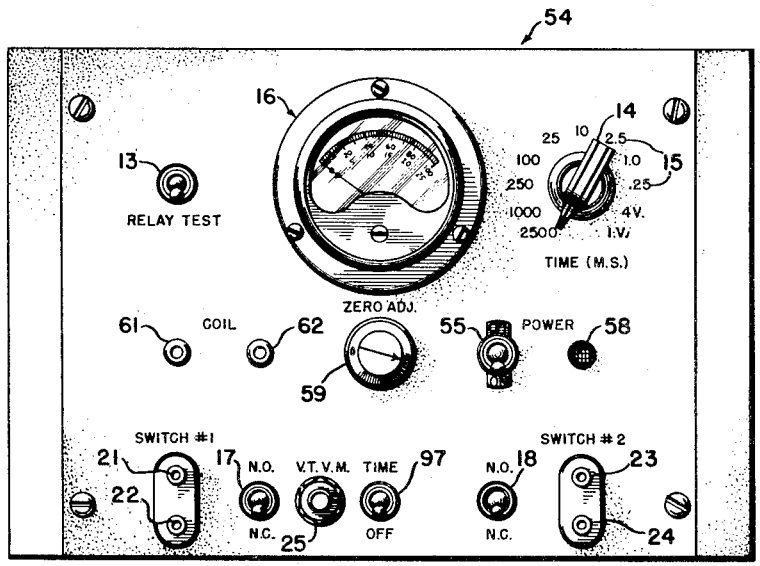
Fig. 2 is a suitable panel arrangement for the apparatus embodying the invention.

The aforementioned capacitor 92 has one terminal thereof connected to terminal post 24 to which the device to be measured may, in certain applications, be connected, the other terminal of capacitor 92 being connected to ground, the terminal posts 21 and 22 having connected thereacross one set of contacts of a normally open double pole, single throw switch 13, for purposes to be hereafter described. As aforementioned, the terminals 21 and 22 are adapted to have connected thereacross a switch or contacts to be tested, the contacts across which may be either normally closed or normally open, as hereafter will be described more fully. The hereinbefore mentioned double pole single throw switch 13 has a second set of contacts connected across terminals or pin jacks 61 and 62 mounted upon the control panel of the apparatus as shown in Fig. 2, for purposes to be subsequently described. Capacitor 92 has connected thereacross the normally open single pole, single throw switch 97 which is denoted the "time" switch of Fig. 2. Connected across terminals 21 and 22 respectively are the two center posts 109 and 110 of a double pole, double throw switch 17. Terminal 108 of switch 17 is connected to ground, terminal 107 is connected to one end of a small battery 68 which may have a potential of the order of 1½ volts, to compensate for the contact potential of the diode 63. Terminal 111 is not connected, terminal 112 is connected to terminal 107. A rectifier tube generally designated by the reference numeral 63 is provided in the circuit for reasons to be hereafter apparent, and may be a double diode having anodes 64 and 66 which are connected together, and cathodes 65 and 67 respectively which are connected together and to the other terminal of battery 68. Anodes 64 and 66 are connected to one terminal post 23 of a terminal strip which is mounted upon panel 54, Fig. 2, and which is adapted to have a second switch or contacts connected thereacross for the purpose of measurement, the other terminal of the terminal strip being designated 24, the second switch to be measured having either normally open or normally closed contacts, as will subsequently be explained more fully.

A second double pole, double throw switch 18 is provided, one center terminal 104 of which is connected to ground, the terminal 105 of switch 18 being connected to terminal 23, the terminal 106 of switch 18 being connected to terminal post 24 and to switch terminal 101, switch terminal 102 not being connected, switch terminal 103 being connected to the arm 14 of an aforementioned single pole, multip'e position switch having a set of terminals 1 to 11, inclusive. Terminals 2 and 3, terminals 4 and 5, terminals 6 and 7, terminals 8 and 9 are connected together respectively. Terminal 1 is connected through a variable resistor 31 in series with a fixed resistor 36 to one contact of a closed circuit jack 93; terminals 2 and 3 are connected through a variable resistor 32 in series with a fixed resistor 37 to the same contact of jack 93; terminals 4 and 5 are connected through variable resistor 33 in series with fixed resistor 38 to the same contact of jack 93; terminals 6 and 7 are connected through variable resistor 34 in series with fixed resistor 39 to the same contact of jack 93, and terminals 8 and 9 are connected through a variable resistor 35 in series with fixed resistor 40 to the same terminal of jack 93. The other moving terminal of jack 93 is connected to the anode of the aforementioned voltage regulator tube 27, from which point a positive potential is applied to the aforedescribed circuit including the rectifier tube 63, capacitor 92, and the terminal strips including terminals 23 and 24, and 21 and 22.

Figure 3:
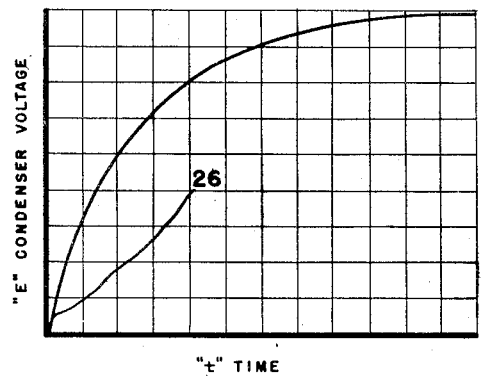
Fig. 3 is a graph illustrating the charge curve of a capacitor when charged from a constant potential source through a resistor, and illustrates a principle of operation employed in the instant invention.

As stated previously, in the instant invention, a linear voltage-time charging relationship is maintained at the timing capacitor or condenser 92 by limiting the charge to a small portion 26 of the charging characteristic curve illustrated in Fig. 3, for example, that portion which lies between the zero $x$ axis and first horizontal scale line. The aforedescribed switch 14 and resistors 31—40 inclusive provide for operation in this manner; as the time interval to be measured increases, the value of the resistance limiting the charging current is increased, thereby limiting the charging current and the voltage acquired by the capacitor to the aforementioned linear portion of the characteristic, suitable choice of component values being made.

It is noted, Fig. 2, that the meter 16 has two full scale readings, 25 and 100, it being understood that the resistors 31–40 inclusive, resistors 52 and 53, and ganged switches 14 and 14' may by suitable arrangement and choice of component values provide for a plurality of time scales having full scale values which are multiples and submultiples of 25 and 100.

The circuit of the apparatus has now been traced and the operation of the apparatus when employed for measuring may now be described. As previously mentioned the apparatus is adapted to measure the time intervals of switches and other make-break and break-make devices of which the contacts may be either normally open or normally closed. Assume by way of example that it is desired to measure the time interval between the switch operations of two test switches which will be designated herein as test switch 1 and test switch 2, and that one of the test switches is connected across terminals 21 and 22 and is adapted to have its contacts normally open and that the other of the test switches, test switch 2, is connected across terminals 23 and 24 and is adapted to have its contacts normally closed. For purposes of illustration it will be assumed that the switch or contacts connected to terminals 21 and 22 operates first. Switch 17 is thrown to its normally open, or right-hand position in Fig. 1 whereas switch 18 is thrown to its normally closed or left-hand position in Fig. 1. Switches 14 and 14' are thrown to the desired time scale. Switch 13 is set in its open position. Time switch 97 is then thrown to its open position, Fig. 1, or up position, Fig. 2. The operations of test switches 1 and 2 are then initiated in normal fashion or by any suitable means. This arrangement of the circuit provides that when test switch 1 is closed the capacitor 92 begins to charge, and when test switch 2 opens the charging current is interrupted and the vacuum tube voltmeter reading on indicator 16 gives a measure of the time interval between the closing and opening of the respective test switches 1 and 2.

Assume now by way of description that it is desired to utilize the equipment of the instant invention in a second test condition in which the test switch 1 connected across terminals 21 and 22 has its contacts normally closed and that the test switch 2 connected across terminals 23 and 24 also has its contacts normally closed. Switch 18 is thrown to the left, Fig. 1, its normally closed position, and switch 17 is also thrown to the left, Fig. 1, its normally closed position. Switch 97, which normally shorts capacitor 92, is then thrown to its open position. This provides a circuit arrangement in which the contacts of test switch 1 normally short the capacitor 92; when they open they unshort the capacitor which then charges until test switch 2 opens the charging circuit. As before, the reading of indicator 16 indicates the time interval between the operation of test switches 1 and 2.

Assume now a third condition of operation in which test switch 1 connected across terminals 21 and 22 has its contacts normally open while test switch 2 connected for testing across contact terminals 23 and 24 also has its contacts normally open. Both switches 17 and 18 are thrown to their normally open "N. O." positions, or their right-hand positions as viewed in Fig. 1, and "time" switch 97 is opened. When the circuit is connected in this manner, when the first test switch closes the condenser 92 starts to charge through the rectifier 63; when test switch 2 closes it shorts the rectifier capacitor combination but the rectifier prevents the back discharge of the capacitor through the shorting circuit including the closed contacts of test switch 2.

Assume now a fourth condition of test in which the test switch 1 connected to terminals 21 and 22 has its contacts normally closed while the test switch 2 connected to terminals 23 and 24 has its contacts normally open. Switch 18 will remain in its normally open position, while switch 17 is closed to the left, Fig. 1, in its normally closed position. Switch 97 is opened. A circuit is thereby provided in which test switch 1 when operated unshorts the capacitor 92 which charges until the closure of test switch 2 shorts the charging circuit, back discharge of the capacitor 92 being prevented as before by rectifier 63.

Figure 4:
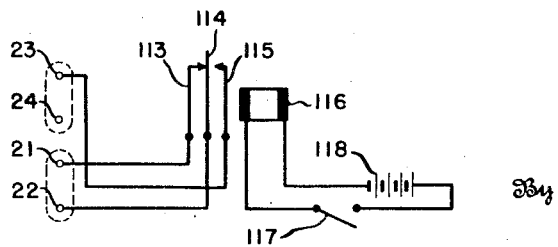
Fig. 4 is a circuit diagram showing the manner in which a relay may be connected to the circuit to measure the time interval between the opening and closing of the contacts thereof.

Assume now another condition of operation in which it is desired to measure the transit time of a moving contact from a normally closed contact to a normally open contact, as for example, the operation of a relay 116, which is connected to the terminals 21, 22, and 23, as illustrated in Fig. 4, to which particular reference is now made, battery 118 energizing the winding of the relay when switch 117 is closed. The moving contact 114 is connected to terminal post 22, the normally closed contact 133 is connected to terminal post 21, and the normally open contact 115 is connected to terminal 23, both switches 18 and 17 being set in their normally closed positions. Time switch 97 is opened. This last described arrangement provides a test circuit in which the capacitor 92 is normally short-circuited while the moving contact 114 is in contact with the normally closed contact 113, and the capacitor is charging only during the movement of the moving contact, contact between the moving contact 114 and the normally open contact 115 shorting the charging circuit, the rectifier 63 preventing back discharge of the capacitor 92 through the shorting connections, the voltmeter 16 indicating the charge on the capacitor 92 and the time required for movement of contact 114 from contact 113 to contact 115.

Assume now another condition of operation in which it is desired to measure the time interval between the energization of a relay winding and the operation of a set of relay contacts. The relay coil is connected in series with a suitable energizing source of potential across the pin jacks 61 and 62 on panel 54, Fig. 2. The contacts of the relay to be tested are connected to terminals 23 and 24 and switch 18 is thrown to its normally closed or normally open position depending upon the type of relay contacts, whether normally closed or normally open. Switch 17 may be set in its normally open position. The time scale is then selected by the operation of switches 14 and 14', and the time switch 97 turned on, whereupon the relay test switch 13 is thrown to its up or closed position. Throwing the relay switch 13 to this position closes the circuit of the relay coil and simultaneously shorts contacts 21 and 22 whereby the capacitor 92 is begun to be charged at the moment of energization of the relay winding, and the charge is discontinued at the moment of operation of the contacts of the relay which breaks or shorts the charging circuit thereby providing an indication on meter 16 which measures the time interval between the application of the voltage to the winding and the operation of the contacts of the relay.

It is obvious that other conditions of operation may be provided, for example, conditions of operation may be set up which provide for measuring relay drop-out time, and the time required for the momentary closing or opening of a switch contact.

Reference is made now to Fig. 2 which shows a layout for a suitable panel arrangement for equipment embodying the instant invention. As previously mentioned the vacuum tube voltmeter has a plurality of scales and a scale selector comprising switches 14 and 14' directly calibrated in milliseconds for providing an increased range for the measuring apparatus. As aforementioned the ganged switches 14 and 14' provide for connecting variable amounts of resistance in the meter circuit and variable amounts of resistance in the charging circuit thereby providing an arrangement for securing maximum accuracy and versatility for the indicating instrument. Aforementioned balancing potentiometer 51 controlled from 59 provides a zero set control.

Aforementioned jack 25 is provided for calibration purposes, and permits a measured voltage to be inserted on control grid 75, or permits a standard vacuum tube voltmeter to be connected in circuit for checking the accuracy of meter 16, or permits direct use of a vacuum tube voltmeter with an appropriate scale. Aforementioned jack 93 is provided in the charging circuit of capacitor 92 for testing, adjustment, and calibration purposes. Pin jack 91, which may be mounted at any convenient position in the apparatus, is also provided for calibration and testing purposes.

Whereas I have shown and described my invention with particular reference to a preferred embodiment thereof which gives satisfactory results, it will be understood by those skilled in the art to which the invention pertains, after understanding the invention, that various modifications and changes of form or structure may be made without departing from the spirit or scope of the invention, and it is my intention, therefore, in the appended claims to include all such modifications and changes.

The invention described and claimed herein may be manufactured and used by or for the Government of the United States of America for governmental purposes without the payment of any royalties thereon or therefor.

What is claimed as new and desired to be secured by Letters Patent of the United States is:

1. A timer for measuring the time required for the operation of a device having two pairs of sequentially operated contacts and comprising, in combination, a capacitor; a rectifier; a variable resistor; a direct current voltage source, a circuit for charging said capacitor from said source through said resistor and rectifier, a plurality of terminals in said circuit for connecting said pairs of contacts into the circuit so that the first operated pair of said two pairs of contacts initiates charging of the capacitor and the second operated pair of the contacts shunts the capacitor and rectifier and terminates charging of the capacitor, said rectifier preventing discharge of the capacitor through said second operated pair of the contacts, and means for measuring the time interval between the operation of said two pairs of contacts in term of the voltage corresponding to the charge assumed by said capacitor, said last-named means comprising two pairs of electron discharge tubes, each of said tubes having a cathode, anode, and control grid, a plurality of circuits individual to said tubes for connecting the tubes as cathode followers, indicating means connected between the cathodes of a first pair of said tubes, connections between the cathodes of the second pair of tubes and the control grids of said first pair of tubes respectively whereby variations in the cathode potentials of said second pair of tubes result in the cathodes of said first pair assuming different potentials with respect to each other, and circuit connections between the control grids of said second pair of tubes and opposite sides of said capacitor respectively whereby said last-named grids are given different potentials with respect to each other proportional to the charge on said capacitor.

2. In an electronic timing circuit for measuring the transit time of break-make contacts including a transfer contact, a break contact normally engaged by the transfer contact, and a make contact adapted to be engaged by the transfer contact upon movement thereof out of engagement with the break contact, the combination of a constant potential source of direct current, a resistor connected to the high potential side of said source, a condenser connected to the low potential side of said source, a rectifier connected between the resistor and the condenser and arranged to charge the condenser from said source through said resistor, a first terminal for connecting said transfer contact to the low potential side of said source, a second terminal for connecting said break contact between the condenser and said rectifier, a third terminal for connecting said make contact between the rectifier and said resistor, said transfer and break contacts initially shorting the condenser and said transfer and make contacts upon engagement thereof shorting said rectifier and condenser whereby charging of the condenser is initiated as the transfer contact moves out of engagement with the break contact and charging of the condenser is terminated upon engagement of the transfer contact with the make contact thereby to charge the condenser to a voltage proportional to the transit time of the contacts, said rectifier preventing discharge of the condenser through said transfer and make contacts upon engagement thereof, and a high impedance vacuum tube voltmeter circuit connected across the condenser to measure the voltage thereon and calibrated in time units proportional to the condenser voltage thereby to provide a direct measure of said transit time.

3. In an electronic timing circuit for measuring the time interval between the operations of first and second normally open switches arranged to be closed sequentially in the order named, the combination of a constant potential source of direct current, a resistor connected to the high potential side of said source, a condenser connected to the low potential side of said source, a rectifier connected between the resistor and condenser in series therewith, a first pair of terminals for connecting said first switch between the condenser and said rectifier in series therewith, a second pair of terminals for connecting said second switch across the resistor and said source, charging of the condenser being initiated as said first switch closes and the charging of the condenser being terminated as said second switch closes, said rectifier preventing discharge of the condenser through said first and second switches, said resistor having a predetermined value whereby the condenser is charged at a linear rate during the interval between the operation of said switches to a voltage proportional to said interval, and a high impedance vacuum tube voltmeter connected across said condenser to measure the voltage thereof and calibrated in time units proportional to the condenser voltage thereby to give a direct measure of said time interval.

4. In an electronic timing circuit for measuring the time interval between the operations of a normally closed switch and a normally open switch arranged to be operated sequentially in the order named, the combination of a constant potential source of direct current, a resistor connected to the high potential side of said source, a condenser connected to the low potential side of said source, a rectifier connected between the resistor and condenser in series therewith and arranged to charge the condenser from said source through the resistor, a first pair of terminals for connecting the normally closed switch across the condenser thereby to prevent charging thereof until the normally closed switch opens, a second pair of terminals for connecting the normally open switch across said source and resistor thereby to terminate charging of the condenser when the normally open switch closes, said rectifier preventing discharge of the condenser through said normally open switch upon closing thereof, said resistor having a predetermined value whereby said condenser is charged at a linear rate to a voltage proportional to the time interval between the operations of said switch, and a high impedance vacuum tube voltmeter circuit connected across the condenser to measure the voltage thereon and calibrated in time units proportional to the condenser voltage thereby to give a direct measure of said interval.

5. An electronic timing circuit for measuring the time interval between the operations of a pair of sequentially operated switches comprising, in combination, a constant potential source of direct current, variable resistor means connected on one side thereof to the high potential side of said source, a capacitor connected on one side thereof to the low potential side of said source, a rectifier, a first pair of terminals having one of said switches connected therebetween and having one of the terminals thereof connected to one side of said rectifier, a second pair of terminals having the other one of said switches connected thereto and having one of the terminals thereof connected to the other side of said capacitor, a first two-position switch means arranged to connect the other one of said first pair of terminals to said other side of the resistor means when the first switch means is moved into one of the two positions thereof and to connect said one of said first pair of terminals to said other side of the resistor means and said other one of said first pair of terminals to the low potential side of said source when the first switch means is moved into the other position thereof, a second two-position switch means arranged to connect the other one of said second pair of terminals to the other side of the rectifier when the second switch means is moved into one position thereof and to connect said one of said second pair of terminals to said other side of the rectifier and said other one of said second pair of terminals to said one side of the capacitor when the second switch means is moved into the other position thereof, a high impedance vacuum tube voltmeter connected across said capacitor to measure the voltage thereof and including an indicating meter calibrated in time units proportional to the condenser voltage, means for adjusting the sensitivity of said indicating meter, means for adjusting the value of said resistor means, and means for coupling said resistor and meter sensitivity adjusting means for unitary adjustment at will whereby the charging rate of the condenser may be rendered linear during the charging time thereof and the reading of the indicating meter may be caused to fall within the full scale reading thereof.

HOMER T. GITTINGS, Jr.

REFERENCES CITED

The following references are of record in the file of this patent:

UNITED STATES PATENTS

| Number | Name | Date |
|---|---|---|
| 1,553,322 | Miller | Sept. 15, 1925 |
| 1,561,255 | Fry | Nov. 10, 1925 |
| 1,677,157 | Weaver | July 17, 1928 |
| 2,021,766 | Bivens | Nov. 19, 1935 |
| 2,082,123 | Samuel | June 1, 1937 |
| 2,177,569 | Jorgensen et al. | Oct. 24, 1939 |
| 2,329,073 | Mitchell et al. | Sept. 7, 1943 |
| 2,369,619 | Stibitz | Feb. 13, 1945 |
| 2,389,615 | Eder | Nov. 27, 1945 |